United States Patent [19]

Burrows

[11] Patent Number: 4,628,477
[45] Date of Patent: Dec. 9, 1986

[54] PROGRAMMABLE PUSH-POP MEMORY STACK

[75] Inventor: James L. Burrows, Merrimack, N.H.

[73] Assignee: Sanders Associates, Inc., Nashua, N.H.

[21] Appl. No.: 542,326

[22] Filed: Oct. 17, 1983

[51] Int. Cl.[4] .................. G06F 12/00; G06F 9/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 4,038,643 | 7/1977 | Kim | 364/200 |
| 4,075,707 | 2/1978 | Wilmer | 364/900 |
| 4,138,732 | 2/1979 | Suzuki et al. | 364/900 |
| 4,168,523 | 9/1979 | Chari et al. | 364/200 |
| 4,370,729 | 1/1983 | Bosch | 364/200 |
| 4,519,033 | 5/1985 | Vaughn et al. | 364/200 |
| 4,521,851 | 6/1985 | Trubisky et al. | 364/200 |
| 4,550,431 | 10/1985 | Werth et al. | 364/200 X |

Primary Examiner—James D. Thomas
Assistant Examiner—Thomas C. Lee
Attorney, Agent, or Firm—Louis Etlinger; Wm. F. Porter, Jr.

[57] ABSTRACT

A data stack for storing data at sequential locations in a memory and for transmitting the data in modes defined by commands from a host data processing system. A random access memory stores the data in sequential locations at addresses selected by a state signal generator comprising read only memory. The state generator generates the addresses and read/write control signals for the random access memory in response to the commands from the host system and a previous address provided by the generator.

5 Claims, 5 Drawing Figures

FIG. 1C

| S | RAM ADRS |
|---|---|
| 0 | 0 |
| 1 | 1 |
| 2 | 2 |
| 3 | 3 |
| 4 | 0 |
| 5 | 1 |
| 6 | 2 |
| 7 | 3 |
| 8 | 0 |
| 9 | 1 |
| 10 | 2 |
| 11 | 3 |
| 12 | 0 |
| 13 | 1 |
| 14 | 2 |
| 15 | 3 |

S/EW = 11, S, EW

STATES S WORD 30

| COMMANDS C WORD 32 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| HALT | 7/00 | 11/00 | 15/00 | 3/00 | 15/00 | 15/00 | 15/00 | 7/00 | 15/00 | 15/00 | 15/00 | 11/00 | 15/00 | 15/00 | 15/00 | 3/00 |
| PUSH | 1/11 | 2/11 | 15/00 | 9/11 | 15/00 | 15/00 | 15/00 | 1/11 | 15/00 | 15/00 | 15/00 | 2/11 | 15/00 | 15/00 | 15/00 | 3/00 |
| OUT LIFO | 15/00 | 9/10 | 1/10 | 2/10 | 15/00 | 15/00 | 15/00 | 0/10 | 15/00 | 15/00 | 15/00 | 1/10 | 15/10 | 15/00 | 15/00 | 2/10 |
| OUT FIFO | 4/10 | 8/10 | 12/10 | 12/10 | 7/00 | 15/00 | 15/00 | 4/10 | 9/10 | 11/00 | 15/00 | 8/10 | 13/10 | 14/10 | 15/00 | 12/10 |
| OUT USER | | | | | | | | | | | | | | | | |
| OUT USER | | | | | | | | | | | | | | | | |
| OUT USER | | | | | | | | | | | | | | | | |
| RESET | 3/00 | 3/00 | 3/00 | 3/00 | 3/00 | 3/00 | 3/00 | 3/00 | 3/00 | 3/00 | 3/00 | 3/00 | 3/00 | 3/00 | 3/00 | 3/00 |

| CLK | C 32 | S 30 | RAM ADRS | EW 36 | D 34 | DATA AT RAM 12 ADRS | | | DATA OUT 22 |
|---|---|---|---|---|---|---|---|---|---|
| | | | | | | 0 | 1 | 2 | |
| 0 | HALT | 3 | 3 | 00 | | | | | |
| 1 | PUSH | 3 | 3 | 00 | | | | | |
| 2 | PUSH | 0 | 0 | 11 | D0 | D0 | | | |
| 3 | PUSH | 1 | 1 | 11 | D1 | | D1 | | |
| 4 | HALT | 2 | 2 | 11 | D2 | | | D2 | |
| 5 | LIFO OUT | 15 | 3 | 00 | | | | | |
| 6 | LIFO OUT | 2 | 2 | 10 | | | | | D2 |
| 7 | LIFO OUT | 1 | 1 | 10 | | | | | D1 |
| 8 | RESET | 0 | 0 | 10 | | | | | D0 |
| 9 | PUSH | 3 | 3 | 00 | | | | | |
| 10 | HALT | 0 | 0 | 11 | D3 | D3 | | | |
| 11 | PUSH | 7 | 3 | 00 | | | | | |
| 12 | FIFO OUT | 1 | 1 | 11 | D4 | | D4 | | |
| 13 | FIFO OUT | 8 | 0 | 10 | | | | | D3 |
| 14 | RESET | 9 | 1 | 10 | | | | | D4 |
| 15 | HALT | 3 | 3 | 00 | | | | | |

FIG. ID

PROGRAMMABLE PUSH-POP MEMORY STACK

BACKGROUND OF THE INVENTION

1. Field of the Invention

The invention relates generally to the field of information storage systems used in data processing systems, and more specifically to memory stacks used in such data processing systems.

2. Description of the Prior Art

Memory stacks have been used in data processing systems for a number of purposes, including storing operands used in executing instructions, and saving the state of the host processor while it is executing subroutines or interrupt service routines. A stack is typically a sequential set of addressable storage locations in the memory having a beginning address and an end point identified by the address stored in a stack pointer register. Data may be loaded into the stack, and the contents of the stack pointer register incremented to identify the address of, or "point to", the most recently added data. In some processors, typically known as stack machines, operands are loaded into the stack in the inverse order in which they are to be used by the instructions. Each time an operand is loaded into, or "pushed onto", the stack, the stack pointer increments to identify the location in which it is stored. As each instruction is processed, the items of data on the stack required by the instruction are sequentially retrieved or "popped", from the stack and the instruction is executed. When the item is popped from the stack, the stack pointer decrements to point to the new top of the stack. The result of the processing may be returned to, or "pushed" onto, the stack after they have been processed, causing the stack pointer to again increment.

As has been mentioned, another use of a stack is to store the contents of certain of the processors' working registers while it is executing a subroutine or an interrupt service routine. When a processor interrupts the processing of one program to process another program, the state of the processor at the point at which processing of the first program is stopped must be stored while the processor is processing the other program. After the other program has been processed, the processor then retrieves the state of the prior program, and continues processing it from the point where processing was halted. The state of the processor, that is, the contents of several of its working registers, the program counter (which identifies the next instruction to be executed), and the status register are stored on, or pushed onto, the stack and are popped from the stack and returned to their previous registers when the other program has been processed. Using a stack in this manner allows nesting of interrupts or subroutines since the state of the processor during execution of the each subroutine or interrupt service routine can also be stored on the stack in response to a subsequent subroutine or interrupt service routine, and retrieved when the subsequent program has been processed.

In the prior art, data has generally been retrieved only from the top of the stack. That is, stacks are usually "last in-first out", or "LIFO", memory structures. However, in many instances it is desirable to be able to retrieve data from a stack in an order other than LIFO. For example, in many applications it would be desirable to retrieve stack data in a "FIFO", or first in-first out manner. Also, in some applications it would be advantageous to retrieve the individual items in other orders, such as LIFO or FIFO ODD or EVEN, in which the data stored at odd or even addresses are retrieved in a LIFO or FIFO mode.

In U.S. Pat. No. 3,786,432, issued to William E. Woods on Jan. 15, 1974, a memory stack having a reach down mode is described. An index register is used in conjunction with the stack pointer to identify locations in the stack from which data are retrieved. However, this arrangement would require the processor to know the number of items in the stack in order to reach a particular item.

SUMMARY OF THE INVENTION

The invention provides a new and improved data stack for use with a host data processing system which facilitates the removal of the data items stored in the stack in any order. Accordingly, data stored in the stack can be removed in a LIFO, or "last in-first out", order, a FIFO, or "first in-first out", order, or in other orders selected by a user.

In brief summary, the new data stack includes a random access memory (RAM) in which the data are stored in addressable storage locations. A read only memory (ROM) receives commands from the host system and generates addresses and read and write enabling signals for the random access memory. The commands enable the data to be stored in the memory location in the RAM having the highest address in a push operation, or to be retrieved or "popped" from the stack in either a LIFO or FIFO mode, or in other modes which may be defined by a user. The addresses are generated by the ROM in response to both the command and the address generated in response to the next previous command. Accordingly, the addresses are incremented when data are being stored on the stack, and decremented when data are being retrieved from the stack in a LIFO mode, or they may be incremented from the lowest address in the RAM when the data are being retrieved in a FIFO mode.

In a modification, the address from which an item of data is retrieved from the random access memory can be provided directly by the host system. In other modifications, the commands provided by the host system may be various combinations or modifications of the LIFO and FIFO sequences. For example, in some applications it may be advantageous to retrieve the contents of the storage locations having odd or even addresses, in a LIFO or FIFO basis. These arrangements can be specified in the commands provided by the host system, and the read only memory would provide the addresses for retrieving data from the random access memory, the system would not have to provide addresses for this to occur.

BRIEF DESCRIPTION OF THE DRAWINGS

The invention is pointed out with particularity in the appended claims. The above and further objects and advantages of this invention may be better understood by referring to the following description of an illustrative embodiment of the invention taken in conjunction with the accompanying drawings, in which:

FIGS. 1C and 1D together provide an illustration depicting the use of the data stack depicted in FIG. 1A.

DESCRIPTION OF THE PREFERRED EMBODIMENTS

Figures 1A, 1B:
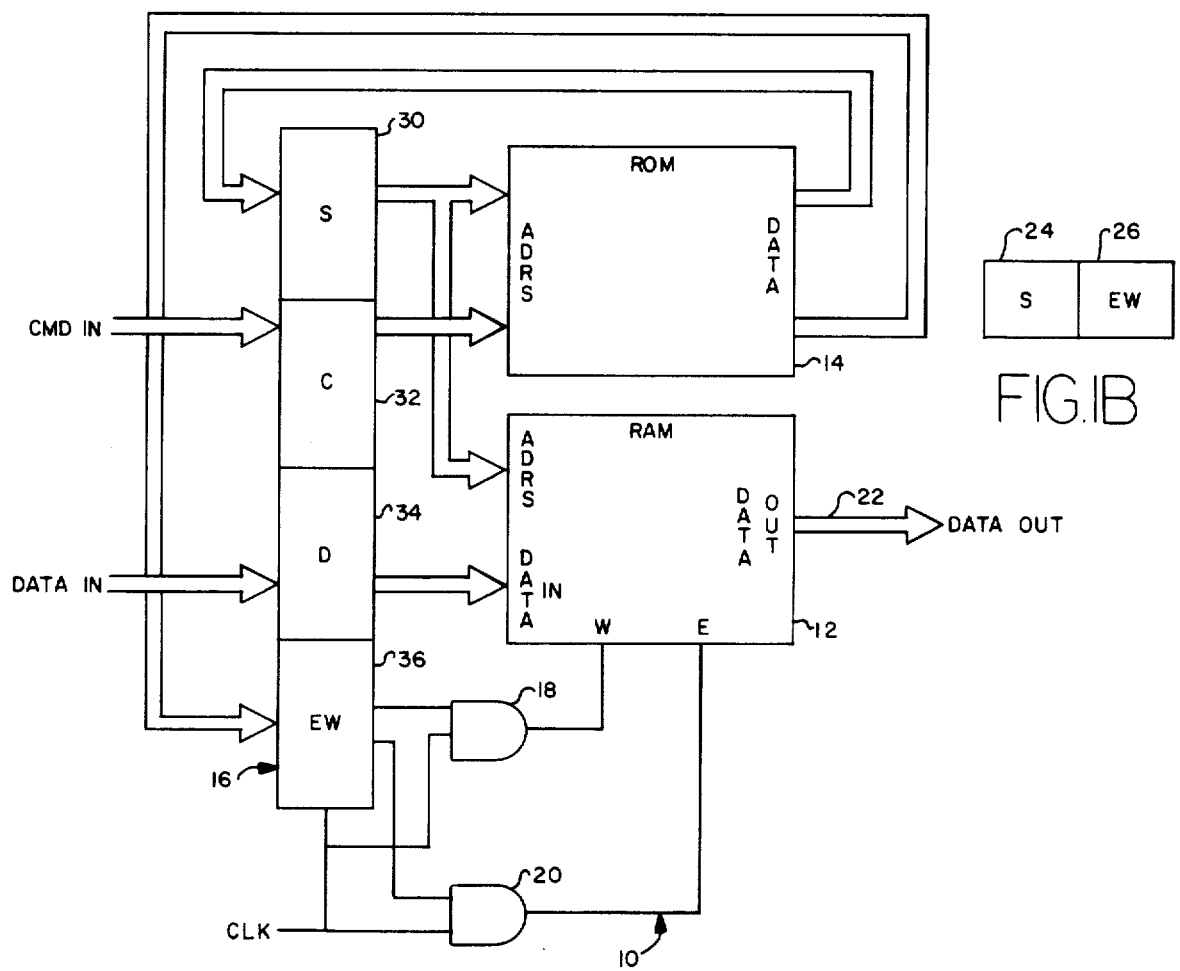
FIG. 1A is a block diagram of a data stack constructed in accordance with this invention.
FIG. 1B is an illustration of a storage location in one of the memories depicted in FIG. 1A.

With reference to FIG. 1A, the new data stack 10 includes a random access memory 12 in which data from a host data processing system (not shown) may be stored in addressable locations identified by a read only memory 14. A register 16 latches, in response to a CLK clocking signal from timing circuitry (also not shown) a command and data from the host processing system. The command may, for example, cause data stack 10 to push data onto the stack, or pop data from the stack in one of several modes identified by the command. The read only memory 14 receives the command from register 16 and generates address signals and signals which enable the random access memory to store the data from the host or to retrieve data from the location identified by the address signals from the read only memory 14.

Register 16 is divided into four words designated "S" (state) word 30, "C" (command) word 32, "D" (data) word 34, and "EW" (enable/write) word 36. The contents of the S (state) and EW (enable/write) words 30 and 36 are provided by read only memory 14, and the contents of a typical storage location in the memory 14 is depicted in FIG. 1B. With reference to FIG. 1B, each storage location in memory 14 includes an S field 24 and an EW field 26, the contents of which are loaded into words 30 and 36 respectively.

A portion of the S word 30 comprises the address of the location in the random access memory 12 in which the data stored in the D word 34 of register 16 is to be written, or from which data is to be retrieved. Preferably, at least several of the least significant bits of the contents of S word 30 are used as the address for memory 12. In one specific embodiment, described below in conjunction with FIGS. 1C and 1D, the S word 30 is four bits in length and the address supplied to random access memory 12 is the two least significant bits. However, the address for memory 12 may constitute the entire contents of S word 30.

The EW (enable/write) word 36 of register 16 determines whether data are stored in the addressed location of memory 12, or read therefrom. In one specific embodiment, the EW word 36 comprises two bits, an "enable" bit (E) and a write control bit (W) each of which, when set, enable one input of AND gates 18 and 20. If the enable bit (E) alone is set, only AND gate 20 is energized by the next pulse of the timing CLK timing signal, which in turn enables the E (enable) input of memory 12, thereby causing the contents of the addressed location to be transmitted over data out lines 22. Contrariwise, if the enable (E) and write (W) control bits are both set, at the next clock pulse both AND gates 18 and 20 will be energized, thereby enabling both the W (write) and E (enable) inputs of memory 12. This, in turn, enables memory 12 to store the data in the D word of register 16 in the addressed location in memory 12 at the address identified by the contents of the S word 30 of register 16.

The contents of the S (state) word 30 and C (command) word 32 of register 16 are coupled to the address inputs of read only memory 14. The combination of signals from the S and C words 30 and 32 constitute address signals for memory 14, which identifies an addressable location in the memory 14. The contents of the addressed location determine the address and the operation, whether "read" or "write", performed by random access memory 12 at the next clock pulse. Specifically, the contents of the addressed location in memory 14 provides the address loaded into the S word 30, as well as the EW (enable/write) signals stored in the EW word 36 of register 16 at the next pulse of the CLK clocking signal. For example, if the host command is a "push", in which data are loaded onto the top of the stack, the top being identified by the address contained in S word 30, the addressed location in memory 14 contains an S field 24 (FIG. 1B) identifying the address in memory 12 that is next higher than the current address contained in the S word 30 in register 16. Furthermore, the EW field of the addressed location in memory 14 contains bits that enable random access memory 12 to write in the addressed location. The contents of the addressed location of memory 14 are transmitted through the memory's data outputs and are latched in words 30 and 36 of register 16 at the next pulse of the CLK timing signal.

It should be noted that the data item to be pushed onto the stack is loaded in the D word 34 at the pulse of the CLK timing signal next following the pulse in which the push command was loaded. That is, the data item is loaded into D word 34 simultaneously with the loading of the address and read/write enabling signals into S word 30 and EW word 36, respectively. At that point, the address in the S word 30 and the enable/write word EW are conditioned to enable the data to be loaded into the proper location in memory 12. The data item is actually loaded into memory 12 at the next pulse of the CLK timing signal, which enables gates 18 and 20, thereby enabling memory 12 to read or write the dat item at the indicated address.

If the command from the host system is a "POP LIFO", which causes the data to be retrieved from the top of the stack, the addressed location in memory 14 contains an S field 24 (FIG. 1B) which points to the last filled location in memory 12, and an EW field 26 (FIG. 1B) whose contents enable AND gate 20 and disable AND gate 18. At the next pulse of timing signal CLK, the location in memory 12 whose address is identified by the S word 30 will be retrieved and transmitted onto data output lines 22. If a second "POP LIFO" command is also loaded in C word 32 in response to the next pulse of the CLK timing signal, memory 14 will access a storage location whose S field 24 and EW field 26 (FIG. 1B) enable memory 12 to retrieve the contents of the location having the next lower address location.

If a "POP FIFO" command is received in C word 32, the addressed location in memory 14 contains an S field identifying the initial or lowest addressed location in memory 12, that is, the addressed location into which the first data item was pushed. If a second "POP FIFO" command is received, the addressed location in memory 14 contains an S field that identifies the next higher addressed location in memory 12. The EW field 26 in both locations of memory 14 contain an enable (E) bit that is set and the write control bit (W) that is cleared so as to enable memory 12 to transmit the contents of the addressed location onto data out lines 22.

An example will illustrate the operation of stack 10. FIG. 1C depicts a memory map 28 of read only memory 14 for an illustrative data stack having three addressable locations identified by addresses "0", "1" and "2", and a reset address, for which no storage location exists, identified by the address "3". The addressable locations are physically located in random access memory 12. From memory map 28 it can be seen that S word 30 for this example can store signals having sixteen states, each identified by a numbered column in memory map 28. This illustrative stack accommodates eight commands, five of which are preprogrammed and shown in memory map 28, and the other three, which are denoted as USER OUT commands, whose portions of memory map 28 are left blank. Each command is associated with a row in memory map 28. As has been mentioned, the contents of S word 30 and C word 32 together provide the address input signals for memory 14. As shown in FIG. 1C, the contents of S word 30 provide a column address, and the contents of C word 32 provide a row address, for a location in memory 14. The contents of each storage location in memory 14 is shown at the row and column associated with the location's address.

FIG. 1C also contains a chart 29 that depicts the relationship between the values (in decimal) of the contents of S word 30 and the address provided to memory 12. As has been mentioned, the address coupled to memory 12 constitutes the least significant bits of the contents of S register 30. In this example, the two least significant address bits are coupled to memory 12 as address signals, while the S word 30 stores four bits.

It is evident from chart 29 of FIG. 1C that each address in memory 12 is associated with four states or values stored in S word 30. Specifically, location 0 in memory 12 will be addressed if the contents of S word 30 have the values 0, 4, 8, or 12; location 1 of memory 12 will be addressed if the contents of S word 30 have the values 1, 5, 9 or 13; location 2 of memory 12 will be addressed if the contents of S word 30 have the values 2, 6, 10 or 14; and the reset address of memory 12 will be provided if the contents of S word 30 have the values 3, 7, 11 or 15. The purpose served by having multiple states of S word 30 identify each address of memory 12 will be made clear following an example of the operation of stack 10, illustrated in FIG. 1D.

FIG. 1D contains an example depicting a command sequence that is useful in understanding the operation of the data stack depicted in FIG. 1A, and which uses the memory map of FIG. 1C. The command sequence is set forth in the second column of FIG. 1D which is headed "C 32". These commands are loaded into C word 32 in response to sequential pulses of the CLK timing signal. The example assumes that the stack 10 was previously initialized by a RESET command, which causes the initial contents of S word 30 to have the value "3" and of EW word 36 to have the value "00", at the CLK 0 pulse of the CLK timing signal, as shown in the first line of FIG. 1D. The first command in the sequence HALT command is loaded into C word 32 at the same time. By reference to chart 29 (FIG. 1C), the address transmitted to memory 12 (the RAM) is also "3", which is shown in the "RAM ADRS" column of FIG. 1D.

Referring to memory map 28 (FIG. 1D), the storage location in memory 14 associated with the command "HALT", when the contents of S word 30 have the value "3", contains an S field 24 which has the value 3, and an EW word 26 which has the value "00". This is shown in the row of memory map 28 which is associated with the HALT command, in the fourth column, which is associated with the state S equal to 3. The contents of this location are loaded into S word 30 and EW word 36 of register 16 at the CLK 1 pulse of the CLK timing signal, along with the PUSH command. This is illustrated in the second line of FIG. 1D. As has been mentioned, the data, D0, associated with this command is not loaded into D word 34 of register 16 until the next pulse of the CLK timing signal, as illustrated in the third line of FIG. 1D.

With reference again to the second line of FIG. 1D, with the first PUSH command, and the contents of S word 30 having the value "3", the location in memory 14 contains an S field 24 which has the value "0" and an EW field which has the value "11" (that is S=0/EW=11). This is shown in the second row of the memory map 28, associated with the PUSH command, and the fourth column, associated with state S equal to 3. At the CLK 2 pulse of the CLK timing signal, signals corresponding to these values are loaded into the S and EW words 30 and 36 of register 16, along with the second PUSH command, which is loaded into C word 32, and the D0 data associated with the first PUSH command, which is loaded into D word 34.

Since the E and W bits are both set in EW word 36, the data D0 in D word 34 will be stored in the storage location in memory 12 identified by the address provided by the two least significant bits of S word 30, namely the storage location in memory 12 identified by the address 0. This is shown in the column in FIG. 1D headed "DATA AT RAM 12 ADRS 0".

The second PUSH command in C word 32 and the S word 30 containing the value 0 addresses a location in memory 14 which contains the values S=1/EW=11, as shown in the second row and first column of memory map 28, that is, the row associated with the PUSH command and the column associated with S equal to 0. The contents of the addressed location of memory 14 are loaded into the words 30 and 36 of register 16 at the CLK 3 pulse of the CLK timing signal, along with the third PUSH command, and data D1 associated with the second PUSH command, as shown in the fourth line of the table in FIG. 1D. The address in memory 12 identified by the contents of S word 30 is a "1" and, since the EW bits are set, the contents of the D word 34, namely the D1 data, are loaded into the identified storage location in memory 12. This is shown in the column in FIG. 1D headed "DATA AT RAM 12 ADRS 1".

At the CLK 4 timing pulse of the CLK timing signal, the HALT command is stored in C word 32 and the S word 30 stores the value "2". The value stored in S word 30 is obtained from the location of memory 14 depicted in the second row ("PUSH") and the second column (S=1) of memory map 28. Simultaneously with the loading of the HALT command, the D2 data associated with the third PUSH command are loaded into D word 34 and stored in memory 12 at address 2. The location in memory 14 associated with the HALT command and S=2 contains the values S=15/EW=00, which are stored in the appropriate words at the CLK 5 pulse of the CLK timing signal.

The next three commands are "LIFO OUT", which is equivalent to a "POP LIFO" command and causes the data to be retrieved from memory 12 on a last in-first out basis. The memory 12 transmits the data item D2, the last item pushed onto stack 10 in response to the first LIFO OUT command, data item D1 in response to the second LIFO OUT command, and data item D0 in response to the third LIFO OUT command.

As shown in the sixth row of FIG. 1D, associated with the CLK 5 pulse of the CLK timing signal, the HALT command and the contents of S word 24 having the value "2" identifies a storage location in memory 14 containing S=15/EW=00. The first LIFO OUT command thus identifies the storage location in memory 14 depicted in the rightmost column of memory map 28, under State 15, in the row associated with the LIFO OUT command. The contents of this location have the values S=2/EW=10, which are stored in the S word 30 and EW word 36 at the CLK 6 pulse of the CLK timing signal, along with second LIFO OUT command. The location in memory 12 having address "2" is identified by the contents of S word 30, and the contents of the EW word 36 enable memory 12 to transmit the contents of this location, D2, over data out lines 22.

The storage location in memory 14 identified second LIFO OUT command loaded into C word 32 during the CLK 6 pulse, and the contents of S word 30 having the value "2" is depicted in the third row and third column (from the left) of memory map 28. This location contains the fields S=1/EW=10, which enable memory 12 to transmit the contents of the location having address 1 to be transmitted over data out lines 22 during the CLK 7 pulse of the CLK timing signal.

Finally, the location in memory 14 identified by the third LIFO OUT command, which is loaded into C word 32 at the CLK 7 pulse, and the contents of S word 30 having the value "1", is depicted in the third row and second (S=1) column of memory map 28. This location has S and EW fields equal to S=0/EW=1, which enables memory 12 to transmit the contents of the location having address 0, namely, the D0 data item, onto data out lines 22 at the CLK 8 pulse.

Also at the CLK 8 pulse, the RESET command is loaded into the C word 32 of register 16. The location in memory 14 addressed by the RESET command and the contents of the S word 30 having the value "0", is depicted in the last row and the leftmost column of the memory map 28, whose contents have the values S=3/EW=00. These values are loaded into the appropriate words of register 16 at the CLK 9 pulse, along with the fourth PUSH command. As before, the data D3 to be pushed onto the stack 10 is loaded into D word 34 at the next CLK pulse, that is, the CLK 10 pulse.

Since the RESET command operates as an initialization command, the PUSH command received at the CLK 9 pulse pushes the associated data item onto the stack at the lowest address. The RESET command effectively initializes the stack, even though it does not, in this embodiment, clear memory 12. As can be seen from the eleventh line of FIG. 1D, which is associated with the CLK 10 pulse, the location in memory 12 into which the D3 data item is written has the address equal to "0", wiping out the D0 data item previously stored there.

The next command, loaded in response to the CLK 10 pulse, is a HALT command. The location in memory 14 addressed by the command and the contents of the S word 30 having the value "0", is depicted in the top (HALT) row and leftmost (S=0) column of memory map 28. The contents of this location, S=7/EW=00, are loaded into the corresponding words in register 16 along with the fifth PUSH command. As shown by the chart 29 (FIG. 1C), the location in memory 12 associated with S=7 has an address "3", the reset address.

When the fifth PUSH command is loaded into C word 32, the location in memory 14 identified by that command and the contents of the S word 30 having the value "7", is depicted in the second row and column number 7 of memory map 28 (FIG. 1C), in which S=1/EW=11. The contents of this location are loaded into words 30 and 36 of register 16 at the CLK 12 pulse, along with the D4 data item to be loaded in response to this push command. As shown in chart 29, the location in memory 12 associated with S=1 has the address equal to 1. The D4 data item is thus stored in the location in memory 12 having address "1" by the CLK 12 pulse.

The next two commands are both FIFO OUT, which is equivalent to the POP FIFO command described above. This command sequentially retrieves the contents of locations in memory 12 having addresses 0 and 1. The first FIFO OUT command is received in C word 32 at the CLK 12 pulse of the CLK timing signal, when the S word 30 has the value "1". The location in memory 14 thus addressed has contents equal to S=8/EW=10, as shown in the FIFO OUT row and S=1 row of memory map 28. These are stored in words 30 and 36 of register 16 at the CLK 13 pulse. As shown by the chart 29 (FIG. 1C), the address in memory 14 corresponding to S=8 is "0", whose contents, D3, are transmitted onto data out lines 22.

The next FIFO OUT command is loaded at the CLK 13 pulse of the CLK timing signal, along with the value "8" loaded into S word 30. These address the location in memory 14 whose contents are depicted in the FIFO OUT row of memory map 28, in the S=8 column, namely, S=9/EW=10. The location of memory 12 associated with S=9 has an address equal to 1 as shown in chart 29 in FIG. 1C. Thus, the contents of location "1" in memory 12, namely the D4 data item, are transmitted onto data out lines 22 at the CLK 14 pulse of the CLK timing signal.

The next command, a RESET command, is loaded into C word 32 at the CLK 14 pulse. Since the contents of S word 30 then have the value "9", the addressed location in memory 14 have the contents depicted in the lowest row and the S=9 column, namely, S=3/EW=00. These values are then stored in the corresponding words of register 16, along with a HALT command, at the CLK 15 pulse.

The reason that the data stack having the memory map 28 has multiple values of S word 30 for each addressable location in memory 12 will now be explained. The multiple states are provided to facilitate transitions among types of commands, that is, from a "PUSH" to a "LIFO OUT", or from a "HALT" to a "FIFO OUT", etc., according to the number of data items in the stack 10. For example, the three PUSH commands of the CLK 1 through CLK 3 clock pulses, pushed three data items onto the stack. After the HALT command (loaded at the CLK 4 pulse), the location in memory 14 was selected from the column associated with the contents of S word 30 equal to "15"; a "reset" address. The next LIFO OUT command selects a location in memory 14 whose S field has the value "2", which corresponds to RAM ADRS 2, as shown in CLK 5 and CLK 6 in FIG. 1D. However, had FIFO OUT commands been received instead of LIFO OUT commands at the CLK 5, CLK 6 and CLK 7 clock pulses, locations in memory 14 associated with states 12, 13 and 14 would have been selected, identifying locations "0", "1", and "2" sequentially, as shown in chart 29.

If only one PUSH command been received prior to the HALT command, the location in memory 14 selected by the HALT command would have an S field 24 having the value "7". This is shown in FIG. 1D in the lines associated with CLK 9 through CLK 11 pulses. The PUSH command of the CLK 9 pulse loads one data item, the D3 data item, into memory 12. The HALT command then causes a location in memory map 28 associated with column S=7 to be addressed by the succeeding command, that is, the command received at the CLK 11 pulse. In the example depicted in FIG. 1D, this command is another PUSH command, and a second data item is pushed onto stack 10 at the location having address "1" in memory 12. However, had the command been a LIFO OUT command, it would be desired that the lone data item at address 0 in memory 12 be retrieved. The storage location of memory 14 associated with the LIFO OUT command and S word 30 having the value "7", has the contents S=0/EW=10, which would cause the location in memory 12 having address "0" to be transmitted onto data out lines 22. If the command had been FIFO OUT, the addressed location in memory 14 would have the contents S=4/EW=10, which would also access the location in memory 12 having the address equal to "0", as shown by chart 29.

The response of stack 10 to two FIFO OUT commands following two pushes is depicted in CLK 12 through CLK 14 of FIG. 1D. The stack accesses portions of memory 14 associated with S word 30 storing values "8" and "9", which are related to columns S=8 and S=9 of memory map 28. However, had the commands been a HALT command followed by two LIFO OUT commands (a HALT command is required before a LIFO OUT command, as illustrated in connection with the CLK 4 and CLK 5 pulses in FIG. 1D), the HALT command would access a location in memory 14 indicated in the top row and S=1 column of memory map 28. As shown in FIG. 1D, the first push causes a location in memory 14 having S=0 to be accessed, and the second push causes a location in memory 14 having S=1 to be accessed. A next HALT command would then access the location addressed by it and by S=1. This location has contents S=11/EW=00. When the contents of S word 30 have the value "11", the LIFO OUT command accesses a location in memory 14 having the contents S=1/EW=0, as shown in the LIFO OUT row and S=11 column of memory map 28. When the contents of S word 30 have the value "1", the location in memory 12 is accessed whose address is "1", as shown in chart 29. The next LIFO OUT command accesses the location in memory 14 depicted in the LIFO OUT row and S=1 column of memory map 28. That location stores the values S=0/EW=10, accessing the location in memory 12 whose address is "0".

Thus, in data stack 10, after three items of data are pushed onto stack 10, and a HALT command has been received, the next LIFO OUT or FIFO OUT command accesses a location in memory 14 associated with S=15. If two items of data are pushed onto stack 10, the next LIFO OUT or FIFO OUT command accesses a location in memory 14 associated with S=11. If one item of data is pushed onto stack 10, the next LIFO OUT or FIFO OUT command accesses a location in memory 14 associated with S=7. This enables the memory 14 to provide the correct sequences of addresses for memory 12 to retrieve data from stack 10 following one, two or three pushes. In addition, the multiple states also allow multiple PUSH commands to be separated by an intervening command, such as a HALT command, and have the succeeding PUSH commands identify the correct location in memory 12, as shown in FIG. 1D in connection with pulses CLK 9-CLK 11.

Figure 2:
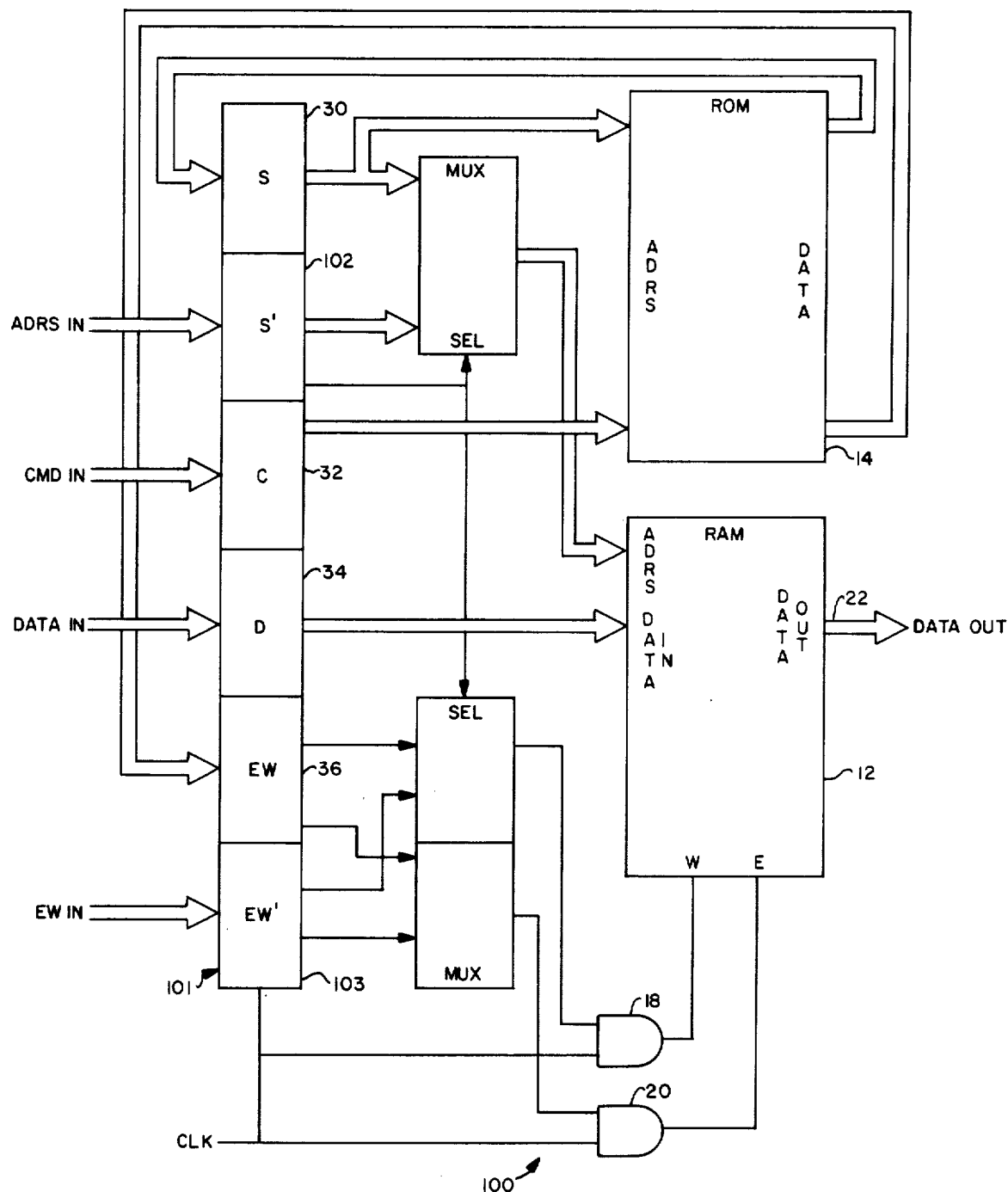
FIG. 2 illustrates a modification of the data stack depicted in FIGS. 1A and 1B.

As has been mentioned, in some instances it may be desirable to enable the host system to load data in or retrieve data from selected locations in the stack. FIG. 2 illustrates a data stack 100 which allows this to occur. The elements of FIG. 2 which are identical to the elements of FIG. 1A bear identical reference numerals. Stack 100 includes the memory 12 into which data are pushed and from which data are popped and memory 14 which selects the addresses from which data are popped or to which data are pushed. Register 101 generally corresponds to register 16 (FIG. 1A), with the S word 30, C word 32, D word 34 and EW word 36. In addition, an S' word 102 which can be loaded by the host enables the host to select the address in memory 12, and an EW' word 103 enables the host to select the operation, whether a READ or WRITE, to be performed by memory 12. A pair of multiplexers 104 and 105, controlled by the host, through a bit in S' word 102, selects the address and operation to be coupled to memory 12. The operation of this stack 100 is otherwise similar to the operation of stack 10 (FIG. 1A).

In summary, there have been disclosed several embodiments of a new programmable data stack. It will be apparent that the specifically disclosed embodiments can be altered while achieving some or all of the advantages of the invention. Therefore, it is the object of the appended claims to cover all such variations and modifications as come within the true spirit and scope of the invention.

What is claimed as new and desired to be secured by Letters Patent of the United States is:

1. A data stack for sequentially receiving data from a data processing system including means for transmitting address signals, means for transmitting data and means for transmitting commands in synchronism with the data, the data stack storing the data and transmitting the stored data in a selected one of a FIFO and a LIFO sequence in response to commands from the data processing system, the data stack comprising:

means for generating timing signals;

a random access memory connected to the data transmitting means and having a plurality of addressable storage locations, means for receiving address signals and data signals and for storing the received data signals in a storage location identified by the address signals in response to the receipt of a write enabling signal, and means for transmitting contents of a storage location identified by the address signals in response to the receipt of a read enabling signal;

state means connected to the timing signal generating means, the command transmitting means and the random access memory for generating read and write enabling signals and address signals identifying a storage location in the random access memory in response to each command in synchronism with the timing signals, the address signals being transmitted to the random access memory address signal receiving means and the state means, the state means generating address signals in response to the commands and address signals transmitted by the state means at the next succeeding timing signal for reading information from the random access memory means in a selected one of a FIFO and a LIFO sequence; and means for selectively coupling address signals from the data processing system or address signals from the state means to the random access memory.

2. A data stack as defined in claim 1 wherein said state means comprises a memory having a plurality of addressable storage locations, means for receiving address signals and means for transmitting contents of addressed storage locations, each storage location having a state field that, when concatenated with the command from the data processing system, provides the address of a location in the state means memory.

3. A data stack as defined in claim 2 wherein each storage location further includes an enable write field that provides a read or write enabling signal.

4. A data stack as defined in claim 3 wherein said address coupling means constitutes a multiplexer and one of the address signals from the data processing system includes a selection signal, said address signal coupling means further including means for coupling said selection signal from the data processing system to said multiplexer.

5. A data stack as defined in claim 4 wherein said data processing system further includes means for transmitting read and write enabling signals, said data stack further including means for selectively coupling the read and write enabling signals from said state means or from the data prcessing system to said random access memory, said selectively coupling means including a multiplexer controlled by the selection signal from the data processing system.

* * * * *